Aug. 4, 1936.  E. G. ROEHM  2,050,124
SPIRAL MILLING MACHINE
Filed May 6, 1935  5 Sheets-Sheet 1
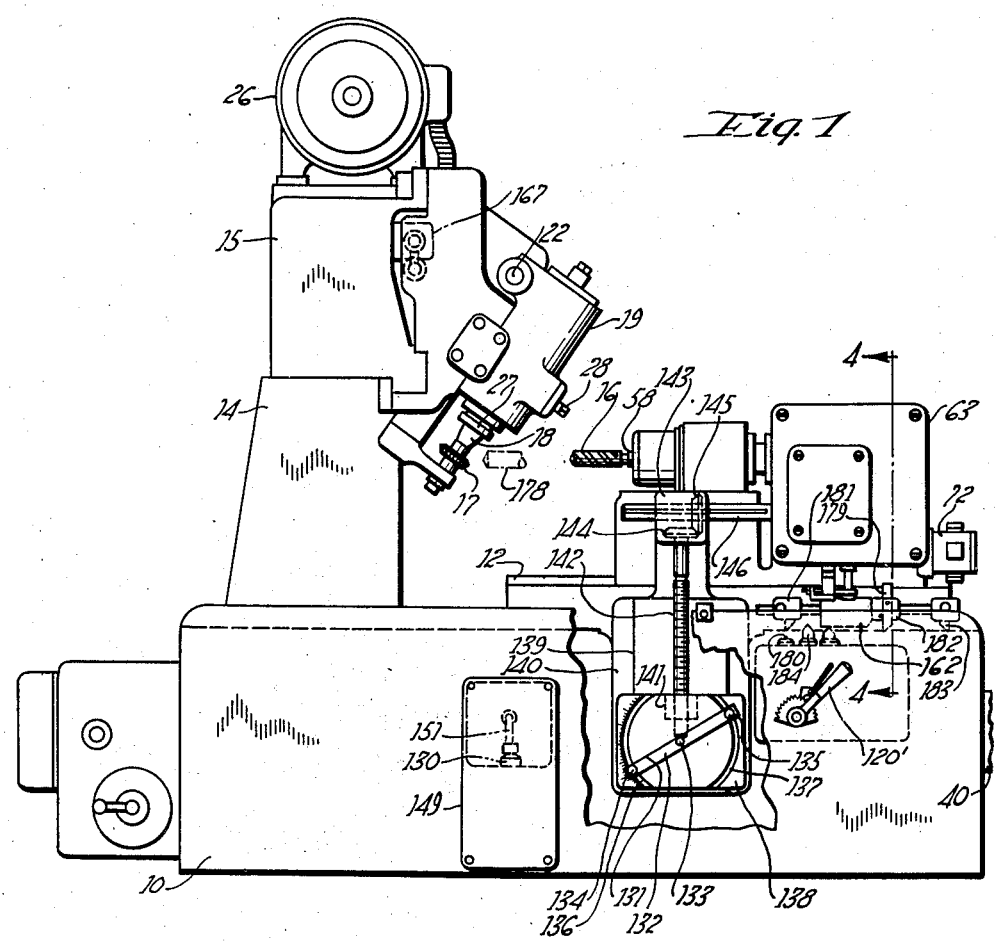
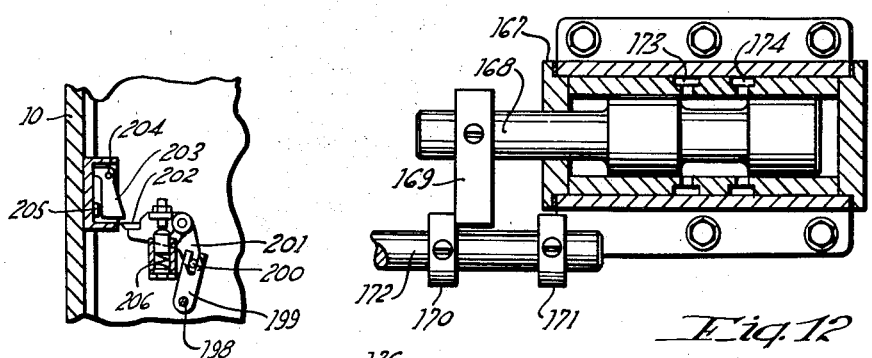
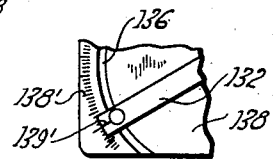
INVENTOR.
ERWIN G. ROEHM
BY
ATTORNEY.

Aug. 4, 1936.  E. G. ROEHM  2,050,124
SPIRAL MILLING MACHINE
Filed May 6, 1935  5 Sheets-Sheet 2

INVENTOR.
ERWIN G. ROEHM
BY
AHK Parsons
ATTORNEY.

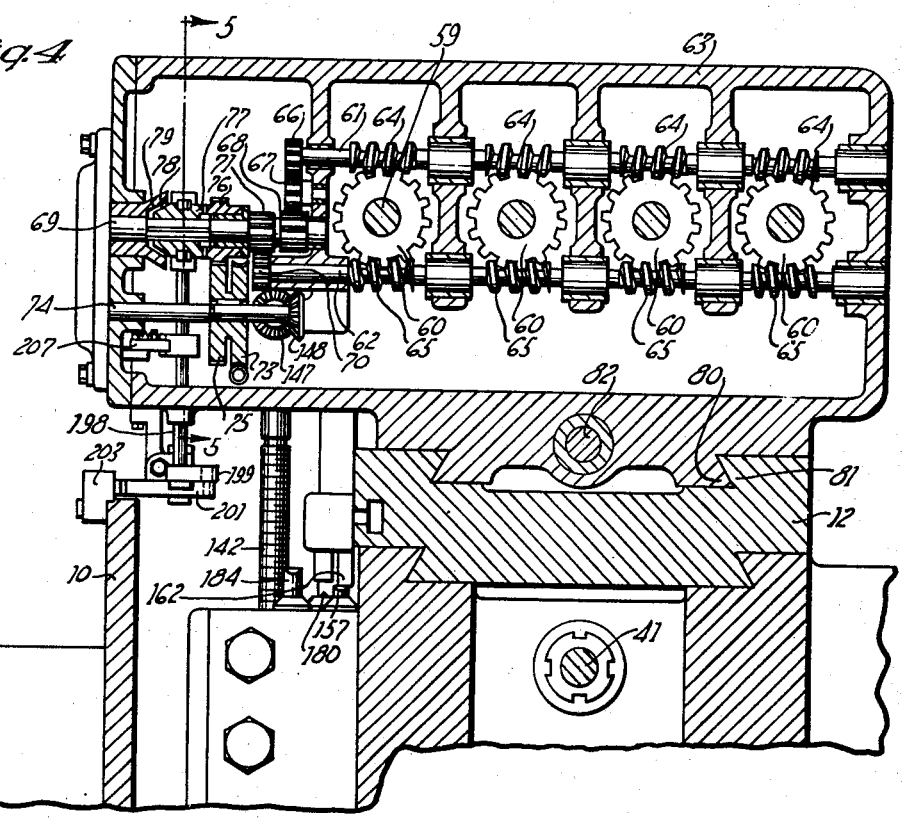
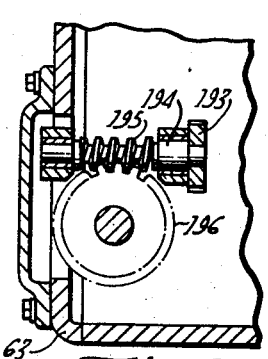
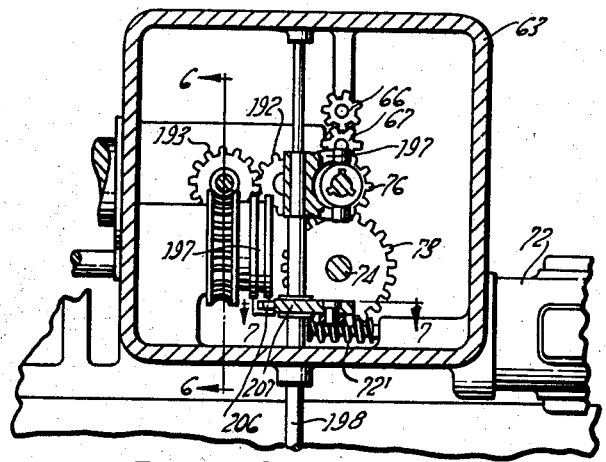
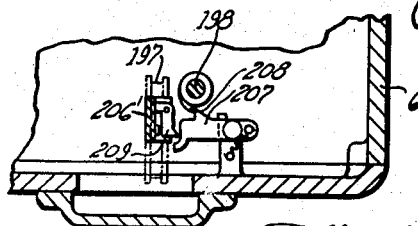

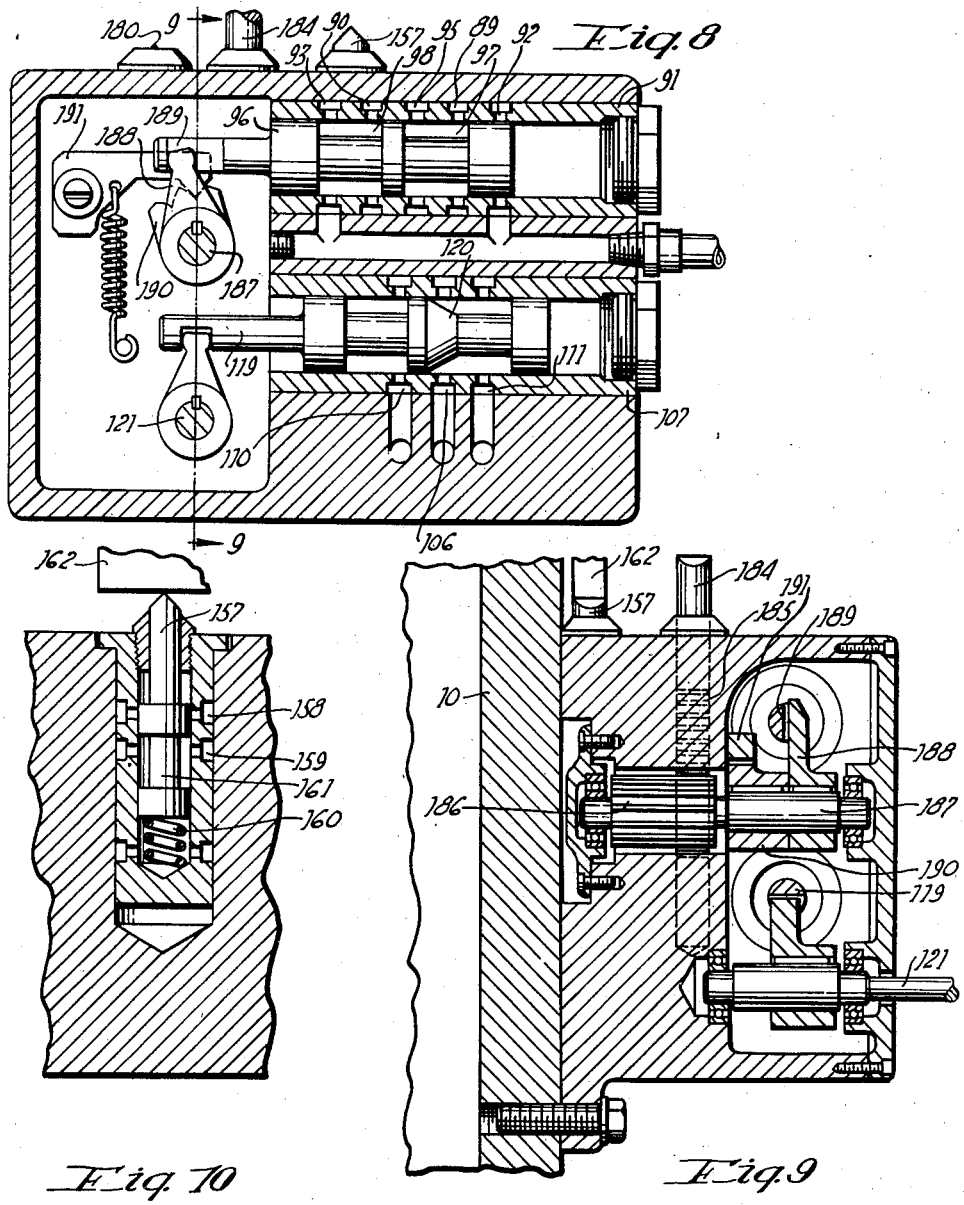

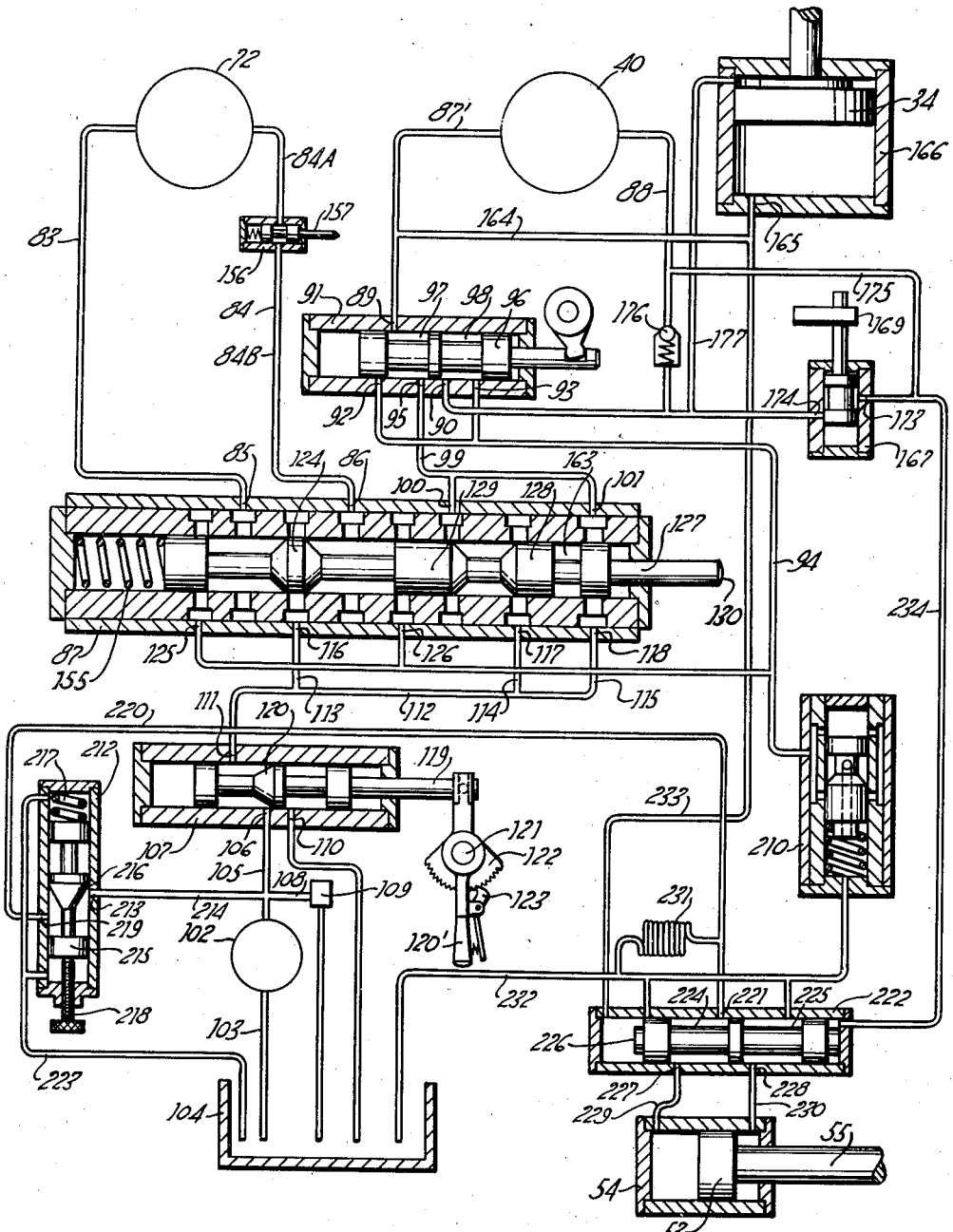

Patented Aug. 4, 1936

2,050,124

UNITED STATES PATENT OFFICE 2,050,124

SPIRAL MILLING MACHINE

Erwin G. Roehm, Norwood, Ohio, assignor to The Cincinnati Milling Machine Co., Cincinnati, Ohio, a corporation of Ohio Application May 6, 1935, Serial No. 19,911

18 Claims. (Cl. 90—19)

This invention relates to machine tools and more particularly to an improved spiral milling machine.

One of the objects of this invention is to provide an improved spiral milling machine which is economical in cost and simple to adjust and operate.

Another object of this invention is to provide an improved pattern controlled spiral milling machine.

A further object of this invention is to provide a machine for milling spiral grooves in cylindrical work pieces which may be automatically controlled from a master having a straight edge arranged at an angle to a reference line which is parallel to the axis of the work and which angle is equal to the pitch angle of the groove being cut.

An additional object of this invention is to provide a pattern controlled machine for milling spiral grooves in cylindrical work pieces in which the work may be automatically indexed while under control of a tracer and master.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 4 is a sectional view on the line 4—4 of Figure 1.

Figure 5 is a sectional view on the line 5—5 of Figure 4.

Figure 6 is a sectional view on the line 6—6 of Figure 5.

Figure 7 is a sectional view on the line 7—7 of Figure 5.

Figure 8 is a vertical sectional view through the control valve block mounted adjacent the front wall of the machine as shown in Figure 1.

Figure 9 is a section on the line 9—9 of Figure 8.

Figure 10 is a detail sectional view of the automatic cut-off valve for the fixture motor.

Figure 11 is a detail sectional view on the line 11—11 of Figure 2.

Figure 12 is a detail sectional view of the delay valve for the table motor.

Figure 13 is a diagrammatic view of the hydraulic control circuit.

Figure 14 is an enlarged detail view of one end of the sine bar showing the graduations associated therewith.

Figure 2:
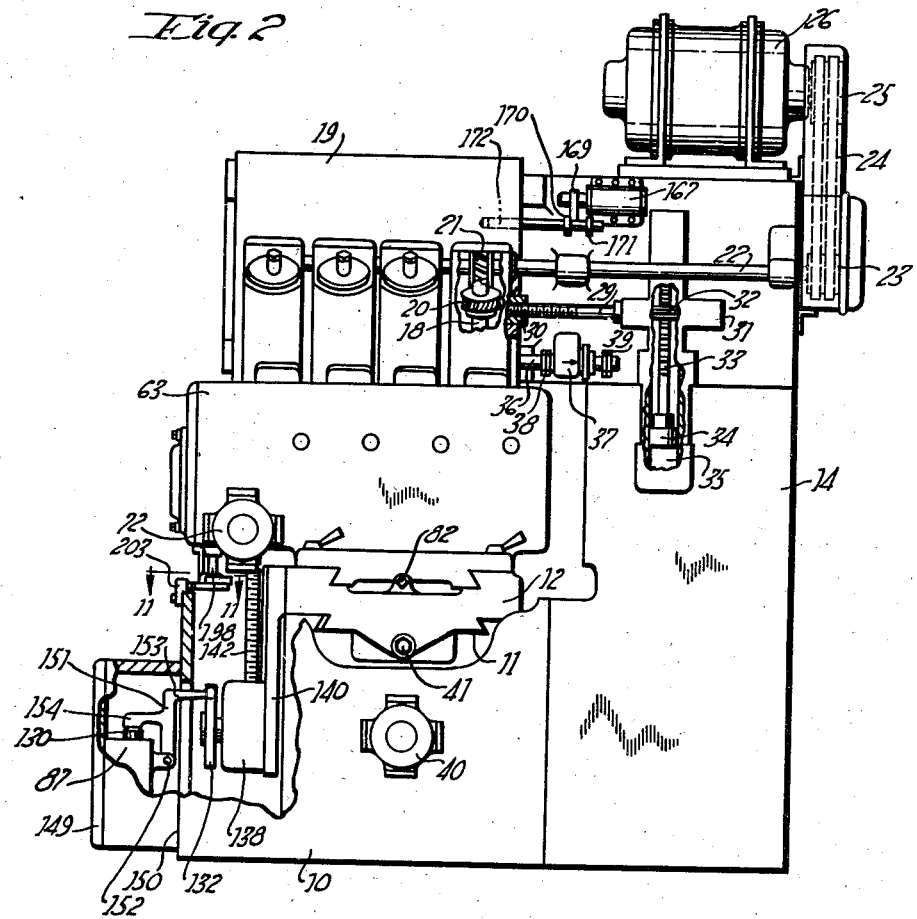
Figure 2 is an end elevation of the machine shown in Figure 1 as viewed from the right hand of that figure.

The machine shown in Figures 1 and 2 is an exemplary embodiment of the principles of this invention and comprises, in general, a bed or support member 10 having guide ways 11 formed thereon for receiving a reciprocable work support or table 12; and a column 13 uprising from one side of the bed upon the top 14 of which is mounted a horizontal rail indicated generally by the reference numeral 15. In general, a work piece such as 16, or a plurality of such work pieces, is supported on the work table for relative movement with respect to a tool 17 or a plurality of tools, and pattern controlled means are provided for controlling relative rotation between the tool and work during the previously mentioned relative movement.

This machine has the capacity for milling grooves in a plurality of work pieces simultaneously, and for purposes of illustration, means have been shown for providing fixtures and tools whereby four work pieces may be simultaneously operated upon. Each of the individual work supporting spindles is the same and each of the tool supporting spindles is the same, and therefore only one will be described in connection with each.

The tool 17 is keyed to a spindle 18 which is journaled in a head 19 which supports the spindle at a desired angle with respect to the axis of the work so that the tool or cutter will lie in a plane corresponding to the plane representing the pitch angle of the groove being cut. The spindle 18 is provided with a spiral gear 20 on the upper end thereof, as shown in Figure 2, and this gear is driven by a second spiral gear 21 keyed to the driving shaft 22. The gears 21 are held against bodily movement with respect to the spiral gears 20 but the driving shaft 22 is splined in the gears 21 whereby the head 19 may be moved relative to the shaft 22, while still maintaining a driving action between the shaft and spindle. The shaft 22 has a pulley 23 secured to the end thereof which is connected by a belt 24 to the driving pulley 25 secured to the end of the armature shaft of motor 26. The motor pulleys and shaft 22 are supported on the horizontal rail 15. By the means thus described the cutter spindles may be power rotated and may also be laterally adjusted while maintaining the driving connection. Each spindle may be supported in a quill 27 for axial adjustment by means of conventional quill adjusting mechanisms terminating in the square ended shaft 28 to which a suitable wrench may be applied.

The object of shifting the head 19 is to move the cutters to and from a cutting position, and in the present instance they are moved to the right, as viewed in Figure 2, to place them in a cutting position, and to the left to retract them. This movement is effected by a screw 29 and a nut 30, the latter being fixed against rotation in the slide 19. The screw is journaled in the bracket 31 against axial movement and has an integral pinion 32 meshing with a rack 33 which is connected to a piston 34 contained in a cylinder 35, whereby reciprocation of the piston will effect advance and retraction of the slide 19. To insure that the cutters are accurately positioned a positive stop is provided in the form of a threaded rod 36 which is fixed with the slide 19 for relative movement through a fixed lug 37. Adjustable lock nuts 38 and 39 are threaded on the rod for engaging the positive stop to limit the movement of the slide in each direction. The movement of the slide 19 or, in other words, the addition of fluid pressure to opposite ends of the cylinder 35 is automatically controlled, and in accordance with the direction of movement of the work support.

Figure 3:
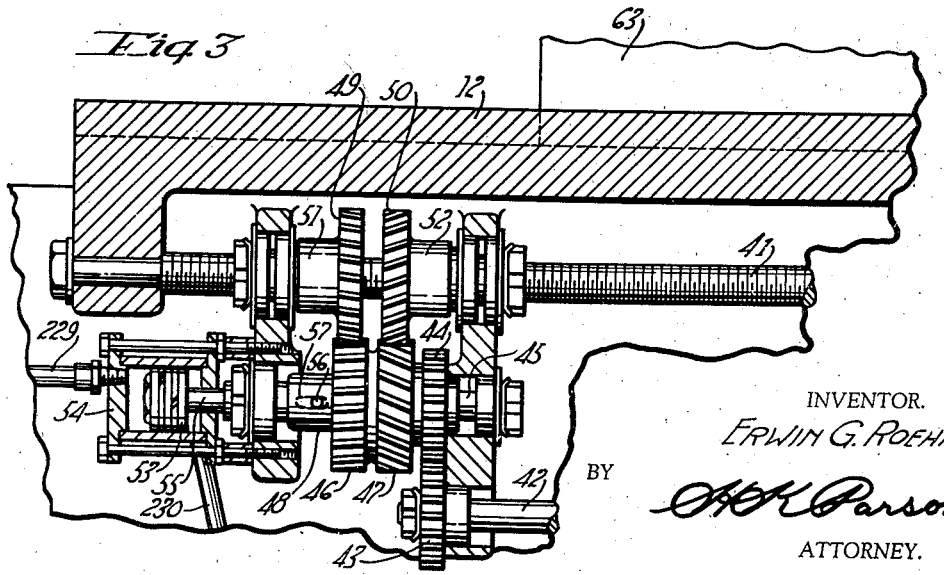
Figure 3 is a partial sectional view showing the transmission train for actuating the work table.

The work support 11 is power traversed by an individual prime mover in the form of a rotary fluid operable motor 40 which is attached to the end of the machine tool bed, as shown in Figure 2, and connected by suitable transmission means more particularly shown in Figure 3 with the table lead screw 41. This transmission comprises a shaft 42 which is directly driven by the motor 40 and has a gear 43 fixed therewith in mesh with a gear 44 mounted for rotation on the shaft 45. The gear 44 is connected by backlash eliminating mechanism for effecting movement of the table and this mechanism comprises a pair of spiral gears 46 and 47 which are integral with the gear 44 on a sleeve 48, which sleeve is longitudinally movable with respect to the shaft 45. These spiral gears have teeth at different spiral angles and intermesh with gears 49 and 50 respectively mounted co-axially of the lead screw 41. This backlash eliminating mechanism is similar to that described in a co-pending application, Serial Number 694,423, filed October 20, 1933, whereby further description thereof is not believed to be necessary. Suffice it to say that the gears 49 and 50 are integral with nuts 51 and 52 which interengage with the screw and may be relatively rotated through the differential action effected by longitudinal movement of the sleeve 48 to eliminate backlash between the drive shaft 42 and the screw 41. This longitudinal movement is effected by a piston 53 contained in a cylinder 54 and connected by a piston rod 55 which extends through the center of shaft 45 and is connected by a cross pin 56 to the sleeve 48. The fluid pressure is admitted to one end of the cylinder when the table is traveling in one direction whereby a backlash eliminating effect is produced for that direction of movement only and the pressure must be reversed when the direction of movement is changed. An elongated slot 57 is formed in the shaft to permit relative movement of the cross pin 56.

Each work piece 16 is supported in a chuck 58 attached to the end of a shaft 59 and the shaft is rotated by a worm gear 60, these worm gears being arranged as more particularly shown in Figure 4. Parallel shafts 61 and 62 extend crosswise of the fixture 63 and the shaft 61 carries a series of worms 64 which intermesh with the respective worm gears 60 on the top side thereof and the shaft 62 carries a series of worms 65 which mesh with the worm gears 60 on the bottom thereof. These shafts are rotated in opposite directions because they are on opposite sides of the axis of the worm gears and are provided for the purpose of eliminating backlash from the work driving mechanism.

The gear 61 has a spur gear 66 which is connected by an idler 67 to a drive gear 68 mounted on shaft 69.

The shaft 62 has a spur gear 70 which meshes with a second drive gear 71 mounted on the shaft 69. The shaft 69 is rotated by a fluid operable motor 72 mounted on the end of the fixture 63, as more particularly shown in Figure 1, and the drive shaft of the rotary motor has a worm 72' meshing with a worm gear 73, which has integral therewith a spur gear 75 meshing with gear 76, mounted for free rotation on the shaft 69. The gear 76 is connected by a shiftable clutch member 77 to the shaft 69 for rotation of the work fixtures. The clutch serves the purpose of disconnecting the work spindles from the hydraulic motor, whereby the motor may be rotated during reciprocatory movement of the work table without rotating the work, and suitable mechanism is provided for automatically disengaging this clutch during the return relative movement between the work and cutter whereby the indexing is effected by letting the work drop behind instead of being advanced ahead of its previous position. When the clutch is disengaged, a cone surface 78 engages a conical-shaped concave surface 79 fixed with the fixture 63 to hold the work against inadvertent rotation.

The fixture 63 has a dovetail guideway 80 formed on the bottom thereof for interengagement with a complementary guide 81 formed on the upper side of the work table 12 and an adjusting screw 82 is provided for moving the fixture whereby the same may be suitably positioned in accordance with the length of the work pieces to be machined.

From the foregoing description it will be seen that a first power operable motor 40 is provided for reciprocating the work table, and a second power operable motor for rotating the work piece and a control circuit is provided for determining proportionate operation of these motors simultaneously to produce a relative spiral movement between the cutter and work which will now be described.

As shown in Figure 13, the motor 72 which rotates the work is connected by a pair of channels 83 and 84 to ports 85 and 86 respectively of a tracer controlled valve 87. The table motor 40 is also connected by channels 87' and 88 to ports 89 and 90 of a reversing valve 91. The reversing valve also has a pair of exhaust ports 92 and 93 which are connected to a common return line 94. A pressure port 95 in this valve is adapted to be alternately connected to lines 87' and 88 by a reciprocable valve plunger 96, which, when in the position shown in Figure 13, connects port 95 with the port 89 by the cannelure 97 and the port 90 with the port 93 by the cannelure 98. When the valve is shifted to the left, the pressure port is connected to port 90 and the port 89 is connected to the port 92. Thus, by shifting the valve the direction of rotation of the table motor 40 may be reversed.

The pressure port 95 is connected by the branched channel 99 to ports 100 and 101 of the tracer control valve 87.

Pressure is supplied to the tracer controlled valve by a pump 102 which has an intake port 103 for receiving fluid from a reservoir 104 and delivering the same under pressure to channel 105, terminating in the port 106 of the throttle valve 107. The channel 105 has a branch line 108 in which is a conventional relief valve 109 whereby oil may return to reservoir when excessive pressures exist in the line 105. The throttle valve 107 has an exhaust port 110 and a delivery port 111, the latter-named port being connected to channel 112 which has three branches—113, 114 and 115, terminating in ports 116, 117 and 118 respectively in the tracer valve 87. The throttle valve plunger 119 has a tapered spool 120 movable with respect to port 106 by a manually operable handle 120' which is rotatably mounted on a shaft 121 for reciprocating the valve plunger 119. An arched quadrant 122 and spring pressed pawl 123 serve to hold the plunger in various adjusted positions. Thus, by moving the throttle valve, the rate of delivery from port 106 to port 111 may be determined and thereby the rate of operation of the machine as a whole thus set.

The port 116 is normally closed by a spool 124, but when shifted laterally in either direction from this position it will alternately connect port 116 with channels 83 or 84 to cause rotation of motor 72 in either direction. The tracer valve 87 also has exhaust ports 125 and 126 which are alternately connectible with ports 85 and 86 respectively with the result that when one of these last-named ports is connected to pressure the other is connected to an exhaust port.

The spool 124 is formed on the plunger 127, which also has tapered spools 128 and 129 formed thereon and movable with respect to ports 117 and 100, and when the plunger is in the position shown in Figure 13 both of ports 117 and 100 will be halfway open. In other words, in this position of the plunger 127 a maximum flow of oil can occur from port 117 to port 100 because if the plunger is shifted to either side of this position one or the other of the ports will be further closed to retard the flow.

The plunger 127 has an end 130 in engagement with a tracer arm adapted to interengage the edge 131 of a sine bar 132. The sine bar is pivotally mounted at its center on a pin 133 for angular adjustment with respect to the horizontal and a pair of T bolts 134 and 135 in opposite ends of the sine bar, and movable in T slots 136 and 137, are utilized for clamping the sine bar in various angular positions. The angularity of the sine bar in cooperation with the tracer determines the rate of rotation of the work for a given length of axial movement thereof and in this manner determines the pitch angle of the spiral groove being cut.

From this it will be seen that the sine bar must necessarily move with the table and to this end the sine bar is supported on a slide 138 movable in guideways 139 formed in an apron 140 depending from the side of the work table 12, as more particularly shown in Figures 1 and 2.

This slide may have graduations 138' thereon which cooperate with a reference mark 139' on the sine bar for indicating directly the necessary setting of the bar to produce a given spiral angle, as more particularly shown in Figure 14.

It is also necessary that the sine bar move in co-ordinated relation with the rotation of the work, and therefore the slide 138 has a nut 141 threaded on a screw 142 which depends from a bracket 143 carried by the apron, the screw being held in the bracket against axial movement. The upper end of the screw is provided with a bevel gear 144 which intermeshes with a bevel gear 145 fixed in the bracket 143 and having a spline connection with shaft 146. This spline connection is necessary if the fixture 63 is to be adjusted relative to the table 12. The shaft 146 extends into the housing 63 where it is provided with a bevel gear 147, Figure 4, intermeshing with bevel gear 148 keyed to the end of the shaft 74 which is rotated from the hydraulic motor 72 through the worm 72' and the worm gear 73. From this, it will be seen that whenever the hydraulic motor 72 is rotated that the sine bar slide 138 will accordingly be moved and independently of the position of the clutch member 77.

The tracer control valve 87 is vertically supported in the valve box 149 attached to the front wall 150 of the machine and a bell crank 151 is pivotally mounted on a pin 152 in this box and has one arm 153 which is adapted to engage the sine bar 132 and a second arm 154 which is adapted to engage the end of the plunger 130. From this it will be seen that as the sine bar is bodily moved in two directions in correspondence to the axial and rotative movement of the work, it acts upon the tracer plunger to maintain the rates of these movements in predetermined proportion to one another whereby a spiral groove of predetermined angle will be cut in the work.

*Operation of the machine*

When the machine is started the slide 12 is in an extreme right position such as that shown in Figure 1 and in this position, which may be termed the loading position, the finished work pieces are replaced by unfinished blanks. The shanks of the blanks are inserted and secured in the various chucks 58 and if the grooves have been preformed in any manner, suitable marking means may be provided to insure that all the blanks are rotatably positioned alike.

In this machine the grooves in the work are progressively cut from the shank end toward the tip and this means that the table 12 must be moved to its extreme left position in order to position the cutters adjacent the shank end of the work blanks; after which the cutters are sunk to depth and the work gradually fed toward the right.

The machine is started by the operator moving the throttle control lever 120 in such a direction as to uncover port 106 in valve 107 so that the fluid will flow to ports 116, 117 and 118 of the tracer control valve 87. It will be noted from Figure 1 that the sine bar is far removed from the tracer control mechanism when the machine is started and therefore the spring 155 may shift the tracer valve plunger 127 to the extreme right as viewed in Figure 13 with the result that port 116 is connected to port 85 and the pressure fluid will flow to the work rotating motor 72, but at this time the channel 84, which is acting as a return channel, is blocked on account of an interlock valve 156 having a plunger 157 which is shifted to a valve closing position.

This valve is more particularly shown in Figure 10 and has a pair of ports 158 and 159, one port being connected to the portion 84A and the other port being connected to the portion 84B of channel 84. A spring 160 acts normally to position the plunger 157 so that the cannelure 161 in the plunger will interconnect these ports. The cam plate 162 carried by the table holds this plunger in a depressed position during the first half of the advancing movement of the slide 12 so as to prevent the motor 72 from rotation when the tracer is not under control of the sine bar.

The spool 129 on the tracer plunger also closes port 100 so that no fluid will flow thereto from the open pressure port 117, but a by-pass cannelure 163 in the plunger 127 is in a position to interconnect pressure port 118 with port 101 so that pressure fluid will flow through line 93, port 95, cannelure 97 of the reversing valve 91, port 89 and channel 87' to the table motor 40. This pressure fluid will also flow through a branch 164 to port 165 of the fluid operable motor 166 which comprises the previously mentioned piston and cylinder 34 and 35 respectively, the piston rod of which, as shown in Figure 2, has rack teeth 33 formed thereon for rotating the screw 29 through pinion 32. The cutter slide 19 has remained in a cutting position during the previous return movement to loading position and the cutters are now moved to a non-cutting position at the initiation of movement of the slide 12 toward the right.

The movement of the slide 19 to a non-cutting position closes the delay valve 167 through the valve means. This valve is shown in detail in Figure 12 and comprises a plunger 168 to the end of which is attached a shifter arm 169 adapted to be alternately engaged by dogs 170 and 171 attached to a rod 172 projecting from the end of the slide 19. As the rod 172 moves to the left, as viewed in Figure 12, the plunger 168 is shifted in such a direction that the ports 173 and 174 are disconnected, or in other words, the valve is closed. This means that the fluid returning from the motor 40 through channel 88 cannot escape through the branch line 175 which has the delay valve serially connected therein, but must force itself past the check valve 176. The purpose of this is that when the channel 88 is connected to pressure during opposite movement of the slide 12 that the fluid will not pass to the motor 40 until the fluid passing through the branch line 177 has shifted the piston 34 in such a direction to move the cutters to a cutting position.

The net result of starting the machine is that only the table motor 40 is rotated which, through the transmission train in Figure 3, shifts the table 12 toward the right. When the end of the work has about reached the position indicated by the dash and dot outline 178, Figure 1, the arm 153 of the tracer lever 151, Figure 2, contacts the sine bar 131 thereby shifting the tracer control valve plunger 127 to the position shown in Figure 13. At the same time the cam 162 passes off of plunger 157 so that the spring 160 now opens valve 156. In this position of the valve plunger 127 port 118 is disconnected from port 101 but port 117 is connected to port 100 so that fluid will still flow to the table motor. During the remainder of the leftward movement of the table the two motors 40 and 72 are under control of the tracer.

Shortly after the tracer has contacted the sine bar and the valve 157 has opened, a dog 179 passes over trip plunger 180, which plunger has already been depressed by the reversing dog 181 attached to the side of the table as shown in Figure 1. The dog 179 is vertically movable in its support 182 whereby it may be manually moved out of the path of plunger 180. The purpose of this dog is to limit the return movement of the work during the cutting operation and after the necessary number of flutes have been cut in the work, the dog 179 is manually lifted to permit the slide to return all the way toward the right to a loading position.

When the slide 12 has reached an extreme left position a second reversing dog 183 attached to the side of the table depresses plunger 184, shown in Figures 8 and 9, which through the medium of rack teeth 185 formed in the side thereof rotates a pinion 186 integral with shaft 187 which has a ball-ended lever arm 188 engaging a slot 189 cut from the side of the reversing valve plunger, as more particularly shown in Figure 8. This shifts the reversing valve toward the right from its position shown in Figure 3 or toward the left as viewed in Figure 13. A detent plate 190, having a pair of notches engageable by the spring pressed detent 191, serves to hold the valve in either one of its two positions.

Depression of plunger 184 also operates through the pinion 186 to elevate the plunger 180 and position the same for engagement by the dog 179.

The shifting of the reverse valve connects the pressure port 95 with port 90 and connects port 89 to the return line 94. Fluid will now flow in line 88 and through branch 177 to cause downward movement of the piston 34 and thereby sinking the cutters to proper depth in the work, which depth will be determined by the position of the stop 38. Completion of this movement will open the delay valve 167 and the fluid will now flow through the branch 175 to motor 40 causing reverse rotation thereof. The tracer will be in contact with the sine bar and the sine bar will thus control the relative rates of rotation of motors 40 and 72 to cause formation of the spiral groove in the work pieces.

After the first groove is cut in the work the dog 179 will, through plunger 180, shift the reverse valve again to the position shown in Figure 13, which will operate to retract the cutters and effect reverse movement of the table. It is necessary during this reverse movement to effect an indexing of the work which is accomplished in the following manner. The gear 76, previously described in connection with Figure 6, and which, as mentioned therein, is permanently connected with the motor 72, is operatively connected as shown in Figure 5 through an idler gear 192 with gear 193. This last mentioned gear is keyed to the end of shaft 194, more particularly shown in Figure 6, which carries a worm 195 meshing with a worm wheel 196, the worm wheel having integral therewith a dog wheel 197.

The clutch member 77 is shifted by a fork 197 fixed on the rotatable shaft 198. This shaft, as shown in Figure 11, has a bifurcated lever 199 secured thereto which is operatively connected through a pin 200 to a bell crank 201. This bell crank has a portion 202 adapted to be engaged by a dog 203 which is fixed to the side of the bed. This dog is pivotally mounted on a pin 204 and a spring pressed plunger 205 serves to hold the dog in an operative position, but still permits the lever 202 to pass over the same when the table is moving toward the right on a cutting stroke. When the table reverses and starts to return, the dog 203 rotates the bell crank against the resistance of a fixed spring 206 and thereby through lever 199 rotates the shaft 198 in a clockwise direction and shifts the clutch 77 in such a direction that the drive is disconnected from the work spindles and the brake is applied to hold the work spindles against inadvertent creepage. The gear 76, however, continues to rotate, thereby continuing the movement of the dog wheel 197, which has a dog 206' attached thereto which is more particularly shown in Figure 7. When the shaft 198 is rotated in a direction to apply the brake it is held in this position by a spring pressed pawl 207 which engages a lug 208 projecting from the side of the shaft.

Thus, even although the bell crank 202 has passed beyond the dog 203 as shown in Figure 11, the clutch is still held in a disengaged position. The dog 206 serves the purpose of engaging the end of pawl 207 and rotating the same in a direction to remove the same from the path of lug 208 so that the spring 206 can rotate the shaft 198 in a counterclockwise direction and effect re-engagement of the clutch. The lever 209 of dog 206 is pivotally mounted so that it may pass by the end of lever 207 in an opposite direction without trouble.

Since the dog 206 is adjustable, it is possible to trip the pawl 207 at any predetermined time whereby the work may be indexed 180° for cutting two spiral grooves, or 120° for cutting three spiral grooves, or at other suitable angles if a greater number of grooves are to be cut.

During the return movement of the table, after cutting the final groove in the work, the operator manually lifts the dog 179 whereby the table 12 will continue its travel until the other reversing dog 181 depresses the trip plunger 180, at which time the table 12 will then be in a loading position and the operator can stop the machine by closing the throttle valve 107.

It will be noted from Figure 13 that the return line 94 has a relief valve 210 in series with it, whereby a predetermined back pressure is maintained throughout the system.

Attention is invited to the fact that the backlash eliminator cylinder 54 is supplied with pressure from the main pump 102 through a throttle valve 212 which controls the pressure in the cylinder. To this end, the trottle valve has a port 213 which is connected by branch 214 to the output line 105 of the pump.

A reciprocable plunger 215, having a tapered spool 216, is constantly urged by a spring 217 in a direction whereby the spool will close port 213. This movement is limited, however, by an adjustable screw 218. The valve has a port 219 which is connected by channel 220 to the pressure port 221 of a reversing valve 222. The upper and lower end of the valve housing 212 may be connected to an exhaust channel 223 to drain off any leakage occurring in the valve.

The port 221 is alternately connected by cannelures 224 and 225 in plunger 226 to ports 227 and 228 respectively which are connected by channels 229 and 230 to opposite ends of cylinders 54.

In order that the pressure in cylinder 54 may be properly controlled by the throttle valve there must be a continuous flow and therefore a bleeder coil 231 is connected to channel 220 for permitting a small continuous flow into the return channel 232.

The plunger 226 is automatically positioned in accordance with the direction of rotation of the rotary motor 40 and this is accomplished by connecting opposite ends of the valve housing 222 by channels 233 and 234 to the supply lines 87' and 88 of motor 40. From this it will be seen that when the pressure in one of these channels is higher than the other, which must necessarily happen if the motor 40 is to operate, the valve plunger 226 will accordingly be shifted to apply pressure in the proper direction on the backlash eliminator piston 53.

There has thus been provided a tracer controlled spiral milling machine, utilizing a simplified hydraulic control circuit which is adjustable for obtaining variable leads on spirally grooved parts without the necessity of utilizing change gears.

What is claimed is:

1. In a spiral milling machine having a tool supporting spindle and a work supporting spindle, the combination of fluid operable means for effecting axial movement of one of said spindles relative to the other, additional fluid operable means for rotating the work supporting spindle, and pattern controlled means for governing the ratio of the rate of operation of said fluid operable means whereby a spiral groove will be formed in the work having a predetermined pitch, said pattern controlled means including a relatively movable sine bar and tracer, the movable member of which is coupled for actuation by one of said fluid operable means.

2. In a machine tool having a rotatable cutter and a slide mounted for reciprocation relative to said cutter, the combination of a rotatable work support mounted on said slide, a fluid operable motor for rotating said work support, a sine bar carried by the slide, and a tracer mounted on a fixed support and contactible with the sine bar for controlling the rate of rotation of said motor during reciprocation of the slide.

3. In a machine tool having a rotatable cutter and a slide movable relative to said cutter, the combination of means for supporting a work piece on said slide for rotary movement and for bodily translation past the cutter, independent power operable means for effecting each of said movements, an auxiliary slide guided for movement on said first-named slide, means coupling said auxiliary slide for actuation by one of said power operable means whereby the ultimate direction of movement of the axial slide is a resultant of the axial and rotative movements of the work, and a device controlled by said axial slide for governing both of said power operable means.

4. In a machine tool having a rotatable cutter and a slide movable relative thereto, the combination of means for effecting said movement including a relatively movable screw and nut pair, one of which is connected to the slide, a fluid operable motor for actuating the rotatable member of said pair, a pair of fluid delivery channels connected to said motor, means for alternately connecting said channels to a source of pressure to cause reversible operation of the motor, a fluid operable backlash eliminator associated with said screw and nut including a piston which is movable in one direction to eliminate backlash during one direction of movement of the slide, and oppositely movable for eliminating backlash during opposite movement of the slide, and shiftable means responsive to the pressure in said channels for alternately connecting the source of pressure to opposite ends of said piston, whereby the backlash eliminator will be reversed upon reversal in the direction of the rotation of said motor.

5. In a spiral milling machine having a rotatable cutter and a reciprocable slide; a rotatable work support mounted on said slide, a fluid operable motor for rotating said support, a clutch for connecting the motor with the support, additional power operable means for moving said slide whereby the work may be rotated and simultaneously moved relative to the cutter in one direction to form a first spiral groove in the work piece, means to reverse the direction of said power operable means to return said work to a starting position, and means for disconnecting said clutch during said return movement whereby the work will be indexed relative to the cutter.

6. In a spiral milling machine having a rotatable cutter and a reciprocable slide; a rotatable work support mounted on said slide, a fluid operable motor for rotating said support, a clutch for connecting the motor with the support, additional power operable means for moving said slide whereby the work may be rotated and simultaneously moved relative to the cutter in one direction to form a first spiral groove in the work piece, means to reverse the direction of said power operable means to return said work to a starting position, means for disconnecting said clutch during said return movement whereby the work will be indexed relative to the cutter, and a brake simultaneously operable with said clutch to hold the work against inadvertent rotation.

7. In a pattern controlled machine tool having a work support and a tool support, means for rotatably supporting a blank on the work support, power operable means for effecting a relative shifting movement between the work support and tool support to position the cutter in the path of the work, a second power operable means for effecting a relative feeding movement between the work support and slide, a third power operable means for effecting rotation of the work, tracer controlled means for determining the rate of operation of said second and third-named power operable means, a reversing mechanism between said tracer control means and said second-named power operable means, and means controlled by said reversing mechanism to cause operation of said first-named power operable means.

8. In a spiral milling machine the combination of a first fluid operable support having a plurality of cutters journaled therein, means for rotating said cutters, a table, means carried by the table for supporting a plurality of blanks, a first fluid operable motor for moving said slide and thereby the blanks bodily past said cutters; a second fluid operable motor operatively connected for rotating said blanks during slide movement; pattern controlled means for governing operation of said motors including a tracer controlled valve, channels extending from said valve to the respective motors, means to supply fluid pressure to said valve, a reversing valve interposed between the tracer control valve and one of said motors for changing the direction of rotation thereof, and means operable by the reversing valve upon movement to change said direction to cause operation of said first-named fluid operable support and thereby shifting of the cutters relative to the path of movement of said work blanks.

9. In a spiral milling machine the combination of a first fluid operable sopport having a plurality of cutters journaled therein, means for rotating said cutters, a table, means carried by the table for supporting a plurality of blanks, a first fluid operable motor for moving said slide and thereby the blanks bodily past said cutters; a second fluid operable motor operatively connected for rotating said blanks during slide movement; pattern controlled means for governing operation of said motors including a tracer controlled valve, channels extending from said valve to the respective motors, means to supply fluid pressure to said valve, a reversing valve interposed between the tracer control valve and one of said motors for changing the direction of rotation thereof, means operable by the reversing valve upon movement to change said direction to cause operation of said first-named fluid operable support and thereby shifting of the cutters relative to the path of movement of said work blanks, and a check valve intermediate said reversing valve and said fluid operable means to delay reverse rotation of said motor until said fluid operable support has completed its shifting movement.

10. In a pattern controlled machine tool having a relatively movable work support and cutter support; a pattern and tracer, one of which is carried by said moving support, power operable means governed by the tracer for controlling the rate of said relative movement, means for reversing the direction of said relative movement, and additional power operable means controlled by said reversing mechanism for effecting a shifting movement between the cutter support and the work support in a direction angular to the direction of said relative movement.

11. In a pattern controlled machine tool having a work support and a tool support, the combination of means to support a pattern on the work support for relative movement with respect thereto, a tracer engageable with said pattern, trip operable means for limiting the length of said reciprocating movement, said slide also being movable to a work loading position in which the tracer will be out of contact with the pattern, and means to render the tracer control mechanism ineffective during movement to and from said work loading position.

12. In a pattern controlled machine tool having a tool support and a work support the combination of means for rotatably supporting a work piece on the work support, a first fluid operable motor for reciprocating the work support, a second fluid operable motor for rotating the work, a pattern movable by said second fluid operable motor relative to the work support, a tracer engageable with said pattern, a tracer control valve for controlling the rate of actuation of said motors, said slide being movable to a work loading position in which the tracer is out of contact with the pattern, and means simultaneously operable upon movement of the table to said work loading position to disconnect said work rotating motor from the influence of said tracer controlled valve.

13. In a pattern controlled machine tool for milling spiral grooves in drill blanks, the combination of a cutter supporting means, a work table, a rotatable work supporting means carried by the table, a pair of fluid operable motors for reciprocating said table and rotating said work respectively, a sine bar mounted for reciprocation relative to the work support and coupled for actuation by one of said motors, a tracer contactible with said sine bar for governing the rate of rotation of said motors, and thereby the pitch angle of said spiral grooves, and means to adjust the angularity of said sine bar to vary the pitch angle of the grooves.

14. In a pattern controlled machine tool for milling spiral grooves in drill blanks, the combination of a cutter supporting means, a work table, a rotatable work supporting means carried by the table, a pair of fluid operable motors for reciprocating said table and rotating said work respectively, a sine bar mounted for reciprocation relative to the work support and coupled for actuation by one of said motors, a tracer contactible with said sine bar for governing the rate of rotation of said motors, and thereby the pitch angle of said spiral grooves, means to adjust the angularity of said sine bar to vary the pitch angle of the grooves, a motion interrupting clutch intermediate one of said motors and the rotatable work supporting means, and means operable by the table during return movement thereof to disconnect said clutch whereby the work will be indexed relative to the cutting means.

15. In a pattern controlled machine tool for milling spiral grooves in drill blanks, the combination of a cutter supporting means, a work table, a rotatable work supporting means carried by the table, a pair of fluid operable motors for reciprocating said table and rotating said work respectively, a sine bar mounted for reciprocation relative to the work support and coupled for actuation by one of said motors, a tracer contactible with said sine bar for governing the rate of rotation of said motors, and thereby the pitch angle of said spiral grooves, means to adjust the angularity of said sine bar to vary the pitch angle of the grooves, a motion interrupting clutch intermediate one of said motors and the rotatable work supporting means, means operable by the table during return movement thereof to disconnect said clutch whereby the work will be indexed relative to the cutting means, and adjustable stop means continuously operated by the work motor for engaging said clutch and thereby determining the amount of said indexing movement.

16. In a pattern controlled machine tool having a cutter support and a work table, the combination of means for rotatably supporting a work piece on the table, a first mechanical train for effecting reciprocation of the table, a second mechanical train for effecting rotation of the work, a pair of hydraulic motors for actuating the individual trains, a fluid operable backlash eliminator in one of said trains, tracer controlled means operatively coupled for controlling the rate of actuation of said motors, a first and second pair of channels connecting said motors with said valve, and means connecting the backlash eliminator for directional operation to the pair of channels leading to the motor which operates the train containing said backlash eliminator.

17. In a pattern controlled machine tool having a tool support and a work support, a rotatable work holder carried by the work support, a first fluid operable motor for reciprocating the work support, a second fluid operable motor for rotating the work holder, a tracer controlled valve, a first pair of channels extending from the valve to the first motor, a second pair of channels extending from the valve to the second motor, a source of fluid pressure connected to said valve, a sine bar carried by the work support and coupled for actuation by one of said motors, a tracer engageable with said sine bar during engagement of the cutters with the work, a stop valve in one of the channels leading to the second-named motor, and a cam carried by the table for shifting said valve to close the channel, whereby upon movement of the work slide to a position disconnecting the tracer from the sine bar said second-named motor will be stopped.

18. In a pattern controlled machine tool having a tool support and a work support, a rotatable work holder carried by the work support, a first fluid operable motor for reciprocating the work support, a second fluid operable motor for rotating the work holder, a tracer controlled valve, a first pair of channels extending from the valve to the first motor, a second pair of channels extending from the valve to the second motor, a source of fluid pressure connected to said valve, a sine bar carried by the work support and coupled for actuation by one of said motors, a tracer engageable with said sine bar during engagement of the cutters with the work, a stop valve in one of the channels leading to the second-named motor, a cam carried by the table for shifting said valve to close the channel, whereby upon movement of the work slide to a position disconnecting the tracer from the sine bar said second-named motor will be stopped, and a by-pass in said tracer controlled valve to permit operation of the first-named motor whereby the slide may be moved to and from a working position.

ERWIN G. ROEHM.